Figure 1:
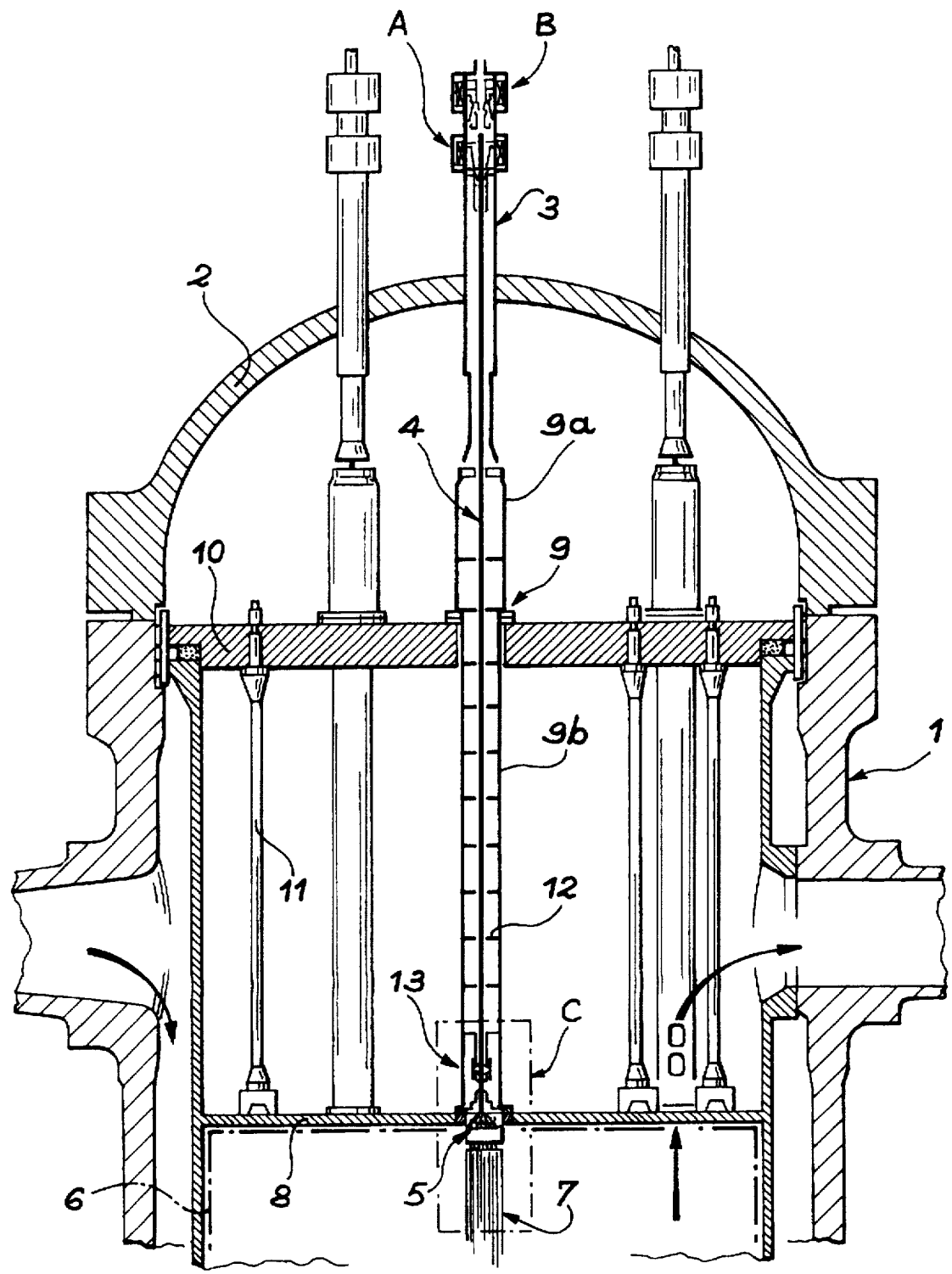

United States Patent [19]

Bergamaschi

[11] Patent Number: 5,761,260
[45] Date of Patent: Jun. 2, 1998

[54] DEVICE FOR UNCOUPLING A CONTROL ROD FROM AN ABSORBING ELEMENT FOR A NUCLEAR REACTOR

[75] Inventor: Yves Bergamaschi, Aix en Provence, France

[73] Assignee: Commissariat a l'Energie Atomique, Paris, France

[21] Appl. No.: 852,459

[22] Filed: May 7, 1997

[51] Int. Cl.[6] .................................................. G21C 19/20
[52] U.S. Cl. ............................................................. 376/233
[58] Field of Search ............................ 376/224, 228, 376/233, 260, 262

[56] References Cited

U.S. PATENT DOCUMENTS 3,262,730  7/1966  Widmer .................................. 376/233
3,408,101  10/1968  Savary .................................... 376/233

FOREIGN PATENT DOCUMENTS 2 302 573  9/1976  France .

*Primary Examiner*—Daniel D. Wasil
*Attorney, Agent, or Firm*—Michael N. Meller

[57] ABSTRACT

The control rod (4) carrying absorbing elements (5) contains an operating rod (37) forced upwards by washers (38) and projecting by a push button end (52). When it is decided to uncouple the absorbing elements, the control rod (4) is raised, so that the teeth (62) of ratchets (56) opened out beforehand weigh on the push button (52), lower the operating rod (37) and enable coupling balls (33) to enter a groove (35) on the bottom of the rod, which detaches the pommel (18) carrying the absorbing elements (5). Application to pressurized water nuclear reactors.

5 Claims, 6 Drawing Sheets

DEVICE FOR UNCOUPLING A CONTROL ROD FROM AN ABSORBING ELEMENT FOR A NUCLEAR REACTOR

DESCRIPTION

The present invention relates to a control rod equipment for a nuclear reactor having an uncoupling means between the control rod and its associated absorbing assembly, which can be put into service prior to the opening of the vessel as from the upper end of said rod with the aid of its displacement mechanism and a retractable stop.

It is known that for the control of existing, industrial pressurized water reactors, there are generally two means for acting on the reactivity, namely the dilution of a neutron poison (boric acid) in the primary water circulating in the core and the vertical displacement of solid, compact, neutron absorbing means in certain of the fuel assemblies of the core.

It is also known that the displacement of these absorbing means is brought about with the aid of electromechanical mechanisms, usually of the ratchet stepwise operation type or having a screw and nut, located, with the exception of their electromagnetic control means, within a tight, tubular enclosure communicating with the interior of the reactor vessel and vertically erected above the sealing cover of said vessel.

These displacement mechanisms for the absorbing means cooperate with a central, small diameter, very long rod, known as the control rod, which descends vertically within the vessel and supports an absorbing means by connecting means manually unlockable from the upper end with the aid of a special tool, once the vessel cover has been removed.

It is also known that the operation of widely used, industrial pressurized water reactors requires a periodic removal of the fuel assemblies of the core in order to bring about a resupply of fuel about once a year. To do this, after removing the vessel cover, the control rods are manually and individually uncoupled from their respective absorbing means with the aid of a special tool and the equipments within the reactor above the core are then removed at the same time as all the control rods, the rods being raised by the internal equipments.

The fuel assemblies are then exposed and can be removed from the reactor core. Naturally, the reactor must be shut down during these operations, which takes place under water and the maintaining in the shutdown state is implemented, so as to satisfy safety standards, by the complete introduction of the absorbing means into the fuel assemblies and dilution of a neutron poison in the primary water.

The manual manipulation of the connections or links, for uncoupling the control rods from the absorbing means, occurs on the critical path of the operations performed during reactor shutdown in order to reload its core, but also for maintenance or possible fault-finding. A relatively long time is required for installing the equipment necessary for uncoupling, unmaking all the links and controlling the uncoupling, e.g. twenty hours in the case of existing, high power, pressurized water, electricity generating reactors. During this time, the personnel is exposed to radiation, which can be of a relatively high level in the case of an inadequate purification of the primary water.

A decoupling device between a control rod and its associated absorbing means is described in French patent 2 261 595 filed in the name of Westinghouse, which permits uncoupling prior to the removal of the vessel sealing cover using the rod displacement mechanism.

Uncoupling and also recoupling take place by lowering and then raising the control rod, whilst the absorbing means is inserted to the bottom in the fuel assembly. These movements have the effect of making a pin or lug turn a cylinder by passing into a network of grooves made in said cylinder, so that the pin or lug is brought into one of the two axially spaced positions, so that the coupling means formed by the lower end of the control rod are brought into the operative or inoperative position and, as a function of the embodiment, are of the flexible plate or bayonet type. The lowering of the control rod for actuating the coupling means is brought about by exerting a compressive force on the rod level with its upper end.

Such a device has the advantage of avoiding the manual uncoupling of the links following the opening of the vessel and consequently reduces the time taken for the core reloading, maintenance and similar operations, whilst reducing the radiation exposure time for personnel.

However, uncoupling is obtained by the application of a compressive force to the control rod and although means exist for controlling forces applied to the rod which are sufficiently accurate, there could be an accidental buckling of said rod due to the application of an overload.

In addition, the coupling means at the bottom of the control rod remain engaged in the gripping member of the absorbing means when in the rest position. Thus, it is possible to fear an uncontrolled extraction of one or more absorbing means from the fuel assemblies during the discharge of internal equipments covering the core if the latter in conventional manner raise the control rods. This can e.g. be due to an alignment fault between the control rods and the gripping member for their associated absorbing means, leading to an untimely latching between the parts in question.

Thus, the present invention aims at supplying means for unmaking the connections or links between control rods and absorbing means prior to the opening of the vessel cover in order to eliminate the conventional manual manipulation and therefore reduce the duration of the reloading, maintenance and similar operations, thereby reducing the radiation exposure doses for personnel. There is no risk of buckling on the part of the control rods and of an untimely withdrawal of rod banks from fuel assemblies during the discharge of upper internal equipments.

In order to achieve this result, the invention proposes the use of a control rod having in the lower part coupling means of the ball type, which are automatically physically separated from the pommel of the rod bank when the means in question are brought into the rest or inoperative position. The hitherto unpublished French patent application 94.14922 also describes ball coupling means between the control rod and its absorbing means, but the uncoupling mechanism is different from that of the present invention and in particular comprises a mobile piston, which brings about uncoupling in the case of an accidental depressurization of the tight enclosure positioned vertically above the vessel cover.

The bringing into the inoperative position of the coupling means according to the invention is initiated by a relative displacement in translation of the control rod relative to a member for locking the coupling means, said member being upwardly extended by operating rod located within the control rod and a push button projecting at the top of the latter.

The relative displacement is produced by raising the control rod with the aid of a displacement mechanism, e.g.

of the screw and nut type manufactured by certain manufacturers, whilst the push button bears against a retractable stop, which can e.g. be constituted by a series of ratchets controlled in much the same way as those of the widely used stepwise ratchet mechanism.

U.S. Pat. No. 3,262,730 also has certain similarities with the present invention. To summarize, the operating rod slides in the rod for controlling the displacement of the absorbing elements and its upper end projects beyond the control rod and terminates in a push button forced downwards in order to commence the uncoupling operations. However, this movement only occurs on unlocking a ball security mechanism, which normally links the operating rod and the control rod. Uncoupling only takes place subsequently by raising the operating rod, the control rod remaining stationary in the initial stage. The operating rod is brought downwards by a spring compressed between it and the control rod and the movement of the push button has no effect on that of the operating rod. Finally, the compressive force of the push button is ensured by a special tool lowered into the control mechanism, but not by the action of a retractable stop automatically encountered by the push button when it rises.

The essential disadvantage of this system is that it is more complicated than the invention and requires pushing on the button in order to unlock the operating rod, followed by the grasping of the top of the operating rod and the raising thereof prior to the raising of the control rod to complete uncoupling. The invention enables the same result to be achieved by simply raising the control rod after descending it to place the retractable stops above the push button at the top of the operating rod and after opening out said stops, which retain the operating rod and drive it into the control rod when the latter continues its rise, which is sufficient to release the cluster of absorbing elements.

To summarize, the mechanism for uncoupling a control rod from an absorbing element for a nuclear reactor comprises an uncoupling operating rod, which slides in the control rod and has an upper end projecting beyond the control rod and a locking system cooperating with the operating rod, the control rod and the absorbing element, characterized in that the operating rod is forced upwards by a spring compressed between the operating rod and the control rod, a retractable stop being provided above said upper end in order to bear on said upper end when the control rod is raised, and in that the operating rod and the locking system are designed so as to bring about uncoupling by pressing the operating rod downwards into the control rod.

The invention is described in greater detail hereinafter relative to non-limitative embodiments and the attached drawings, wherein show:

FIG. 1 An elevation and part sectional view of the vessel and the main internal components of a reactor covered by the invention.

Figure 2A:
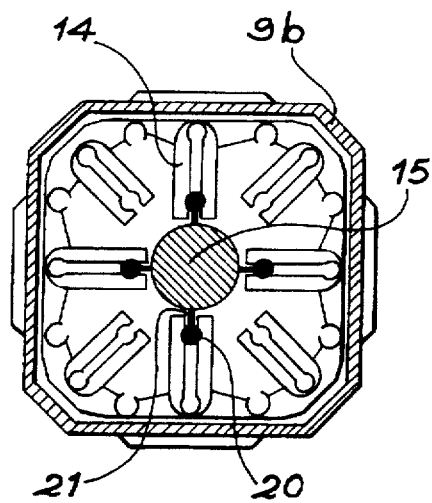
Figure 2:
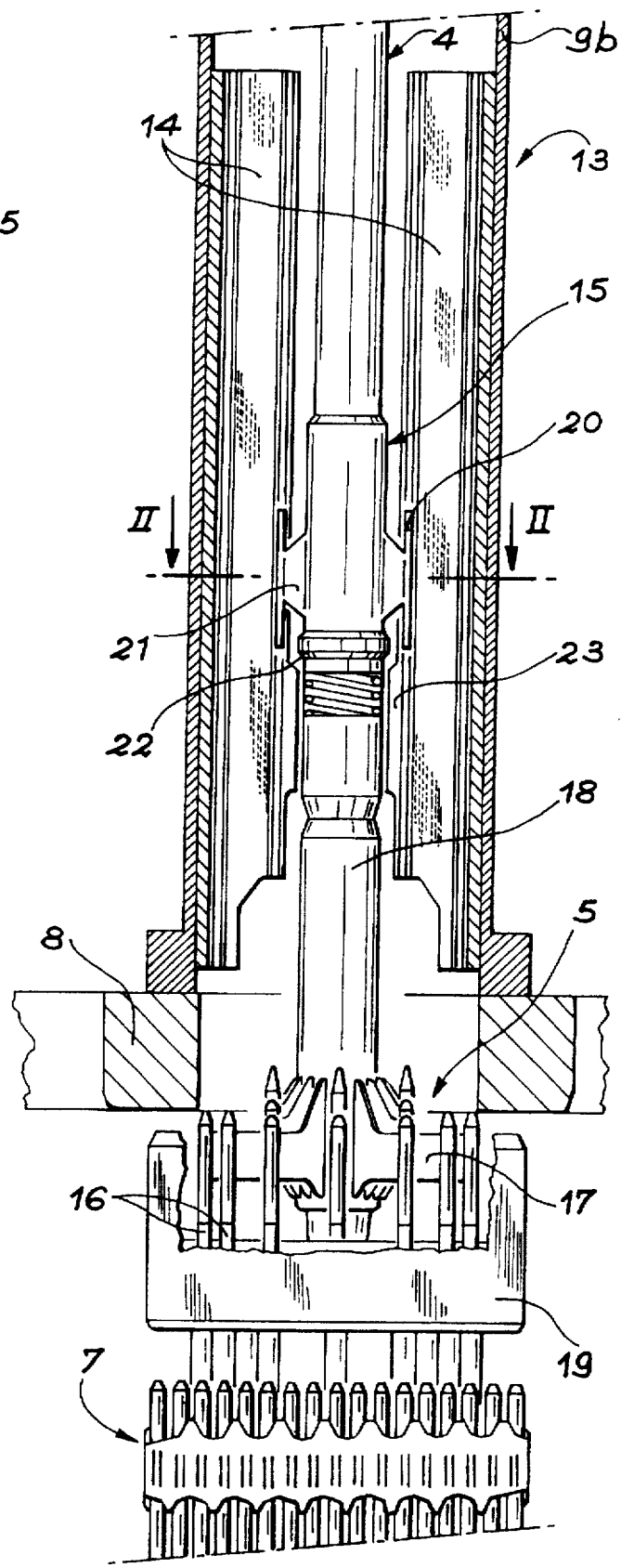

FIG. 2 A view of the part of the internal components located within the frame designated C in FIG. 1.

FIG. 2a A section of FIG. 2 along line II—II.

Figure 3:
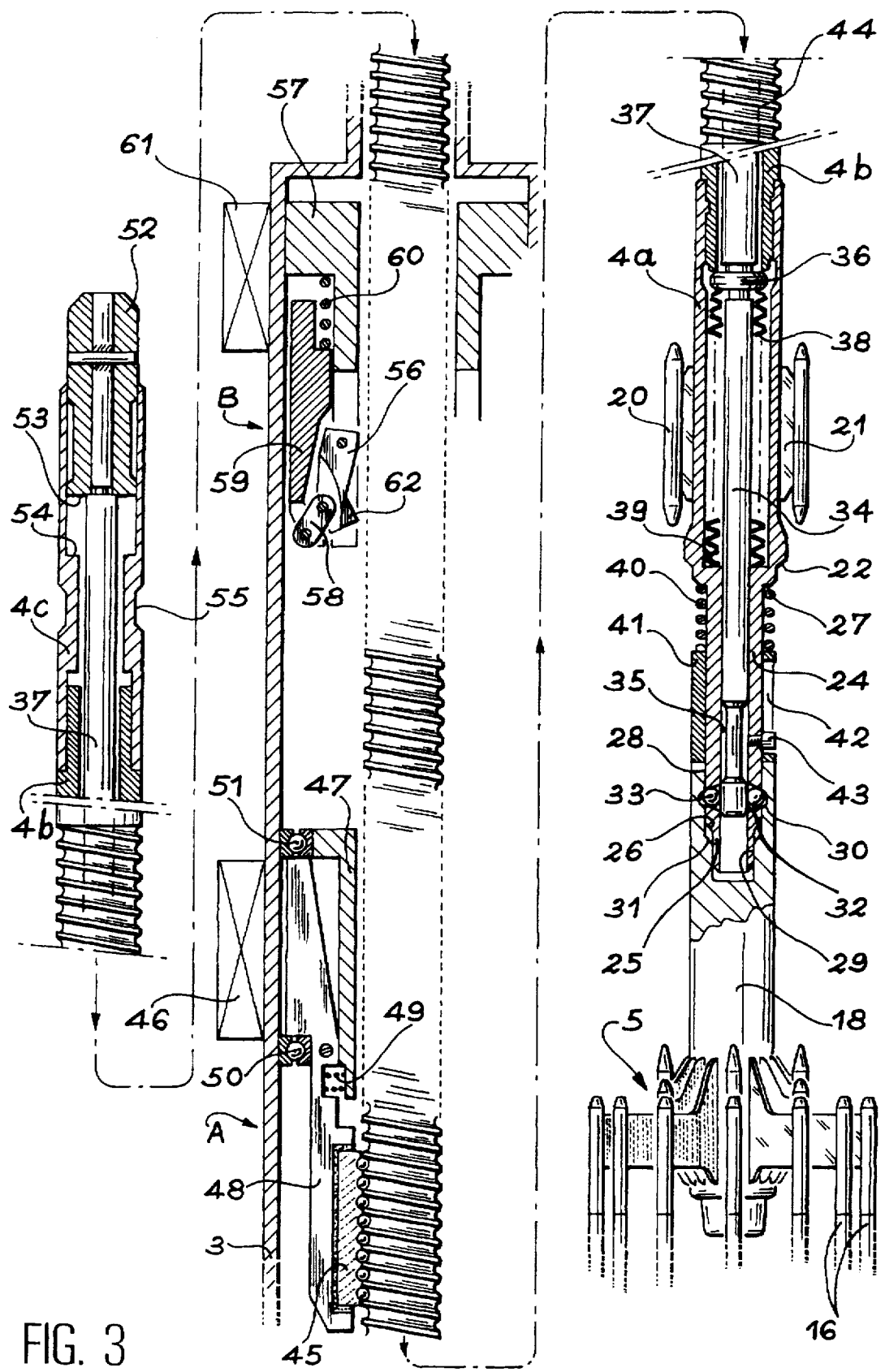

FIG. 3 A sectional view through a vertical plane of symmetry of the invention, the reactor being in operation.

Figure 4A:
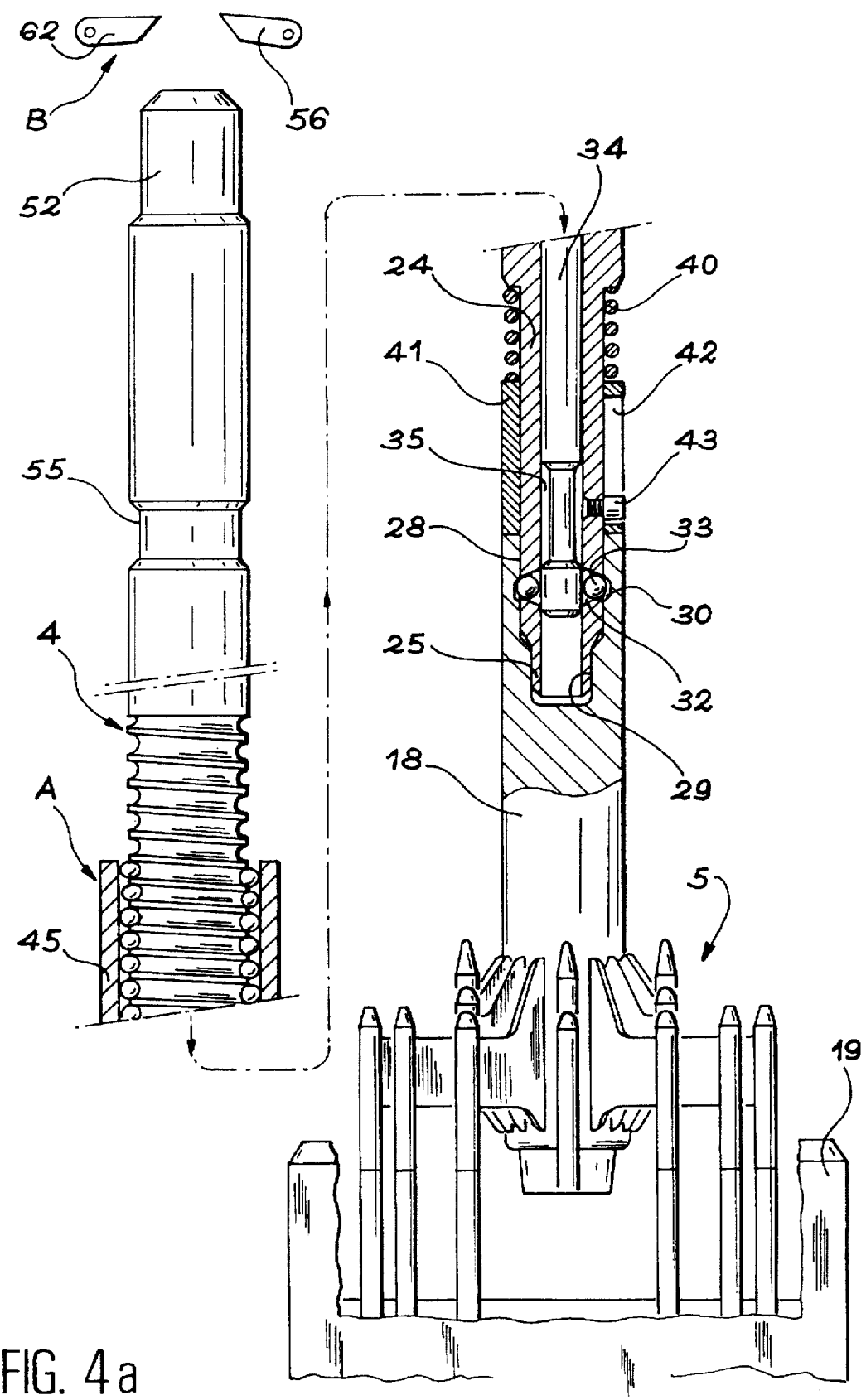
Figure 4B:
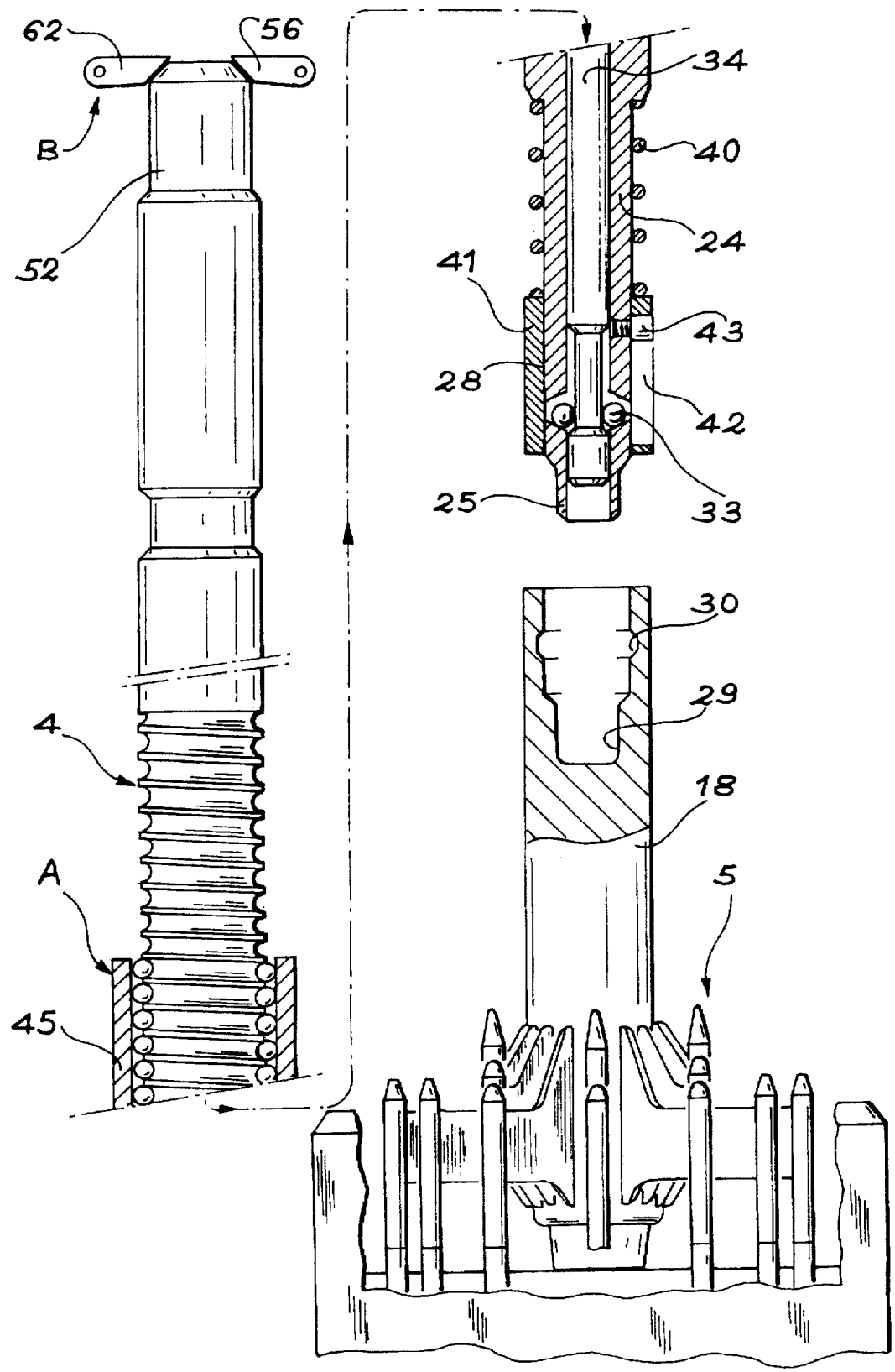
Figure 4C:
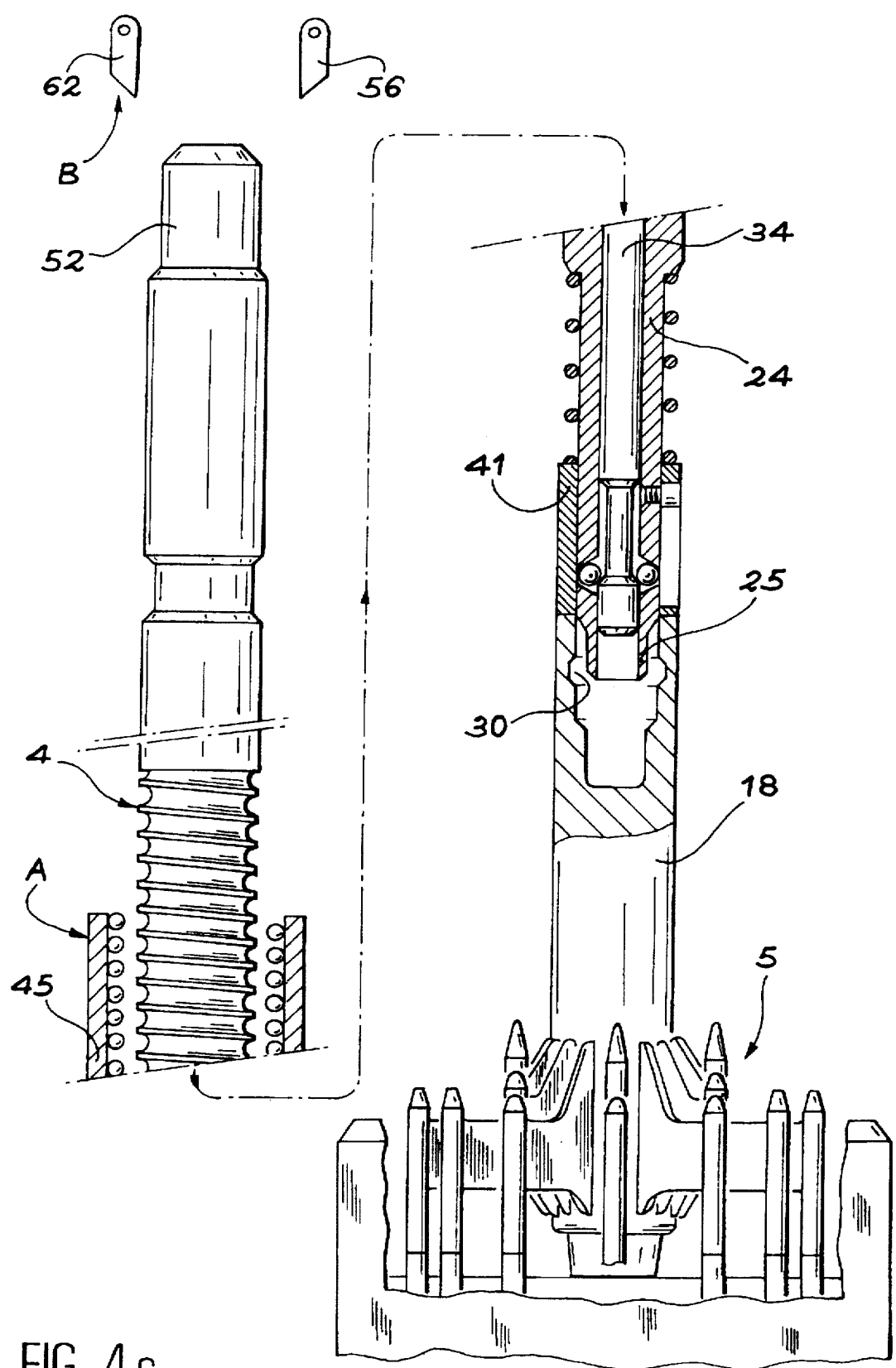

FIGS. 4a, 4b and 4c Elevation and sectional views of the position assumed by the components of the invention during an uncoupling between the control rod and its absorbing means for reloading the reactor core, maintenance, etc.

FIG. 1 shows the vessel 1 of a pressurized water nuclear reactor sealed in its upper part by a cover 2 supporting tight enclosures 3.

Within each of the enclosures 3 are provided two superimposed electromechanical mechanisms, namely a screw-nut mechanism and a separable screw A and a ratchet mechanism B. The mechanism A permits the vertical displacement of a control rod 4, in the lower part of which is suspended an assembly constituted by a plurality of rods containing a neutron-absorbing material and known as a rod bank. The mechanism B, placed above the mechanism A, permits the presentation of an obstacle on the path of the control rod 4.

As in the prior art, a system for detecting the position of the control rod 4 is placed on each of the enclosures 3. The reactor core 6 is constituted by a plurality of juxtaposed fuel assemblies 7. The upper limit of the core 6, above the fuel assembly 7, is defined by a core plate 8. The setting of the reactivity in operation is ensured by introducing to a greater or lesser extent the rod banks 5 into certain of the assembles of the core 6.

Above the core 6, the rod banks 5 slide within boxes 9, known as rod bank guides and constituted by two superimposed elements 9a and 9b. These boxes or cases 9 are suspended in the vertical position on an upper support plate 10 attached to the vessel 1 and connected to the core plate 8 by fixing columns 11. The equipments located above the core 6 form a rigid assembly and are known as upper cores. Perforated transverse plates 12 located at different levels within the boxes 9, ensure a discontinuous guidance of the rod bank 5. A continuous guidance means 13 is installed in the lower part of the lower elements 9b, in an area where the primary water coming from the core escapes radially from its elements 9b to pass out of the vessel 1.

FIG. 2 shows on a larger scale the continuous guidance means 13 partly constituted by split sleeves 14 and the contours of the coupling means 15 connecting the control rod 4 to the rod bank 5, the latter being constituted by several rods 16 suspended on the radial arms 17 of a fixing part having a pommel 18 for assembly with the control rod 4.

For example four cylindrical fingers 20 are fixed to the bottom of the control rod 4 by means of radial ribs 21 and slide within the split sleeves 14 of the continuous guidance means 13, when the rod 4 is displaced over a certain height in the vicinity of its bottom, terminal position.

Prior to the raising of the cover 2 from the vessel 1, e.g. for carrying out a resupply of fuel, the reactor is cooled and depressurized, a certain neutron poison quantity is diluted in the primary water and the rod banks 5 are brought into the maximum insertion position within the fuel assemblies 7, their pommel 18 resting on the upper end piece 19 of the fuel assembly 7.

Once the control rods 4 are uncoupled and freed from the pommels 18 of the rod links 5 and the sealing cover 2 of the vessel 1 is removed, the control rods 4 are raised, as in the prior art, by lifting the upper cores. During this discharge operation, the rods 4 are raised by the upper cores by means of a shoulder 22 provided in the lower part thereof and which is displaced by attachment teeth 23 provided on the sleeve 14 of the continuous guidance means 13.

The recoupling of the control rods 4 with the rod banks 5 takes place, as in the prior art, prior to the sealing of the vessel 1 with the aid of a special tool, which is housed at the upper end of the control rod 4.

The invention is shown in FIG. 3. The control rod 4 is formed from bottom to top by three cylindrical jackets 4a, 4b and 4c fixed rigidly end to end.

The bottom jacket 4a has in its lower part two successive contractions, namely a first contraction 24, whose cross-section is cylindrical, surmounting a second, cylindrical contraction 25, whose cross-section is square. The cylindrical contraction 24 is connected, in the lower part, to the square contraction 25 by means of a conical bearing surface 26, and in the upper part, to the remainder of the jacket 4a by means of a shoulder 27.

The pommel 18 of the rod bank 5 has a recess 28 with a cylindrical cross-section and a recess 29 with a square cross-section in order to receive the bottom of the jacket 4a with a certain clearance. A circular locking groove 30 is machined within the cylindrical recess 28 and is connected to the square recess 29 by means of a conical bearing surface 31.

A series of radial, truncated cone-shaped cutouts 32 are formed in the thickness of the bottom jacket 4a level with the cylindrical contraction 24 and on the same axial side. The truncated cone-shaped cutouts 32, whereof the base issues into the interior of the jacket 4a, come in front of the locking groove 30 of the pommel 18 of the rod bank 5 when the control rod 4 is pressed into the pommel 18 for contacting the conical bearing surfaces 26 and 31.

Within each cutout 32 of the jacket 4a is placed a ball 33, whose diameter exceeds the thickness of said jacket 4a. The ball 33 is free within the interior of the truncated cone-shaped cutout 32. The contracted part of the truncated cone is dimensioned so as to prevent a complete freeing of the ball 33 towards the outside of the control rod 4.

A locking rod 34 is placed within the bottom jacket 4a and has, just above its lower end, a circular groove 35 and, in the upper part, a collar 36, is extended upwards by a long operating rod 37.

The locking rod 34 and operating rod 37 constitute a rigid assembly, which can be in solid block form, which is central and coaxial to the control rod 4 and displaceable along its axis between a lower position and an upper position.

A stack of elastic washers 38, mounted with prestress on the locking rod 34, forces upwards the collar 36 and therefore the assembly constituted by the locking rod 34 and operating rod 37, bearing on a shoulder 39 machined on the inner surface of the jacket 4a. The prestress of the elastic washers 38 is such that said washers 38 normally maintain the assembly constituted by the elements 34 and 37 in the upper position, the top of the collar 36 being engaged against the lower end of the intermediate jacket 4b of the control rod 4.

When said assembly 34 and 37 is in the top position, the locking rod 34 has its solid, lower end facing the balls 33.

A spring 40 and an extracting tube 41 are mounted on the contraction 24 of the lower jacket 4a. The tube 41 has an axial opening 42 in which is engaged a clamp screw 43 fixed to the jacket 4a. The spring 40 bears on the shoulder 27 of the jacket 4a and forces downwards the tube 41. When the control rod 4 is out of the pommel 18, the extracting tube 41 is stopped in the bottom position by the clamp screw 42 and is subject by the spring 40 to a force at least equal to the weight of the control rod 4.

The shoulder 22, making it possible to discharge the control rods 4 at the same time as the upper cores, is located above the contraction 24 of the bottom jacket 4a. Above said shoulder 22, support ribs 21 of the cylindrical fingers 20 are fixed to the jacket 4a. The length of these fingers 20, whose ends are chamfered, can optionally exceed the spacing of the perforated plates 12 of the rod bank guides 9, so that the fingers 20 can always cooperate with a guidance part (split sleeve 14 or perforated plate), no matter what the axial position of the control rod 4.

The intermediate jacket 4b has an external thread 44, over a height slightly exceeding the travel of the rod bank 5, on which is engaged the two-part nut 45 of the mechanism A for the displacement of the control rod 4.

The electromechanical mechanism A has a rotary motor, whose stator 46 is located outside the tight enclosure 3, the rotor 47 being located within said enclosure 3. The rotor 47 supports two pivoting arms 48, the upper end of said arms 48 constituting the magnetic poles of the rotor 47. To the lower end of each pivoting arm 48 is fixed a half roller nut 45. The arms 48 form a clamp openable by a spring 49. These rotary parts are maintained on the enclosure 3 by ball bearings 50 and 51.

The operating rod 37 rises within the intermediate jacket 4b and top jacket 4c. A cylindrical push button 42 is rigidly fixed to the upper end of the operating rod 37 and projects above the top jacket 4c, no matter what the relative position between the operating rod 37 and the control rod 4. When the assembly constituted by the operating rod 37 and locking rod 34 is in the lower position, the base 53 of the push button 52 bears on a shoulder 54 machined within the upper jacket 4c and the groove 35 of the locking rod 34 faces the balls 33.

A housing or stowing groove 55 is machined on the outer surface of the top jacket 4c for the engagement of the element for taking the special recoupling tool.

Finally, within the tight enclosure 3 and at a certain distance above the push button 52 when the control rod is in its bottom, terminal position and the pommel 18 rests on the upper end piece 19 of the fuel assembly 7, the ratchet 56 of the electromechanical mechanism B are placed at the same level.

There can e.g. be three ratchets 56 at 120° from one another, being suspended, level with their upper end, with a possibility of tilting, on an upper, annular, magnetic pole 57, which is rigidly fixed to the tight enclosure 3 which receives it. The ratchets 56 are integral level with their lower end with a link 58, which is integral with a lower, annular, magnetic pole 59 axially mobile within the enclosure 3. The fixed 57 and mobile 59 magnetic poles are forced away from one another by a spring 60. An annular coil 61 is fitted to the right of the poles 57 and 59 outside the amagnetic, tight enclosure 3. Finally, the ratchets 56 are provided in the lower part with a tooth 62 oriented towards the control rod 4.

We will now describe the operation of the invention between two fuel resupplies of the reactor core. The position assumed by the components according to the invention during normal reactor operation is shown in FIG. 3.

The control rod 4 is coupled in translation to the rod bank 5. The locking rod 34 is maintained in the upper position under the effect of the thrust exerted by the stack of elastic washers 38 beneath the collar 36. The top of the collar 36 strikes against the lower end of the intermediate jacket 4b and in front of the balls 33 the locking rod 34 has a solid part maintaining said balls 33 partly engaged in the thickness of the bottom jacket 4a and in the locking groove 30 of the pommel 18 of the rod bank 5.

The balls 33 transmit to the pommel 18 of the rod bank 5 axial forces exerted by the mechanism A on the control rod 4. The solid part of the locking rod 34 keeps the balls 33 in a radial position permitting the transmission of these forces. By forcing back the extracting tube 41, which abuts against the pommel 18 of the rod bank 5, the spring 40 maintains a permanent contact between the balls 33 and the parts 18, 4a and 34 with which they cooperate.

The stator 46 of the electromechanical mechanism A is under tension. Thus, said stator 46 attracts the upper part of the pivoting arms 48 in such a way that the two half-nuts 45 are kept in the closure position on the thread 44 of the control rod 4. The supply of the coils of the stator 46 so as to create in said stator 46 a rotary field, gives rise to the rotation of the two nut parts 45, bringing about the rise or fall of the control rod 4, which is immobilized in rotation by the engagement of the square 25 terminating its lower part in the recess 29 of the pommel 18 of the rod bank 5, which is itself locked in rotation by rods 16 sliding within the guide parts 14 or 12 of the rod bank guide 9.

The lower, mobile, magnetic pole 59 of the ratchet electromechanical mechanism B is kept spaced from the upper, fixed, magnetic pole 57 by the spring 60 and consequently acts on the links 58 in such a way that said links 58 maintain the ratchets 56 completely retracted within the fixed pole 57 carrying them. This arrangement of the ratchets 56 makes it improbable that they will become latched with the control rod 4 sliding between the ratchets 56 for adjusting core reactivity.

Before opening the vessel for fuel resupply purposes, each of the control rods are subject to the operations described in conjunction with FIGS. 3, 4a, 4b and 4c.

Firstly, the two-part nut 45 is engaged with the control rod 4 and the rod bank 5 which is to be detached is in the maximum or almost maximum insertion position in the fuel assembly. In the second case, illustrated in FIG. 4a, the pommel 18 of the rod bank 5 is a few centimeters above the upper end 19 of the fuel assembly 7.

The external control coil 61 of the ratchet electromechanical mechanism B is supplied by a direct current and thus magnetizes the two magnetic poles 57 and 59. The lower, mobile pole 59 is attracted towards the fixed, upper pole 57 and the links 58, integral with the mobile pole 59, thus radially push the lower end of the ratchets 56. This makes them rotate about their upper, fixed axis and position the teeth 62 to the right of the control rod 4, as illustrated in FIG. 4a.

The ratchets 56 are sufficiently far removed from the upper end of the control rod 4, constituted by the push button 52, to prevent any interference between said elements, bearing in mind the precision of the position detection system of the control rod 4.

The control rod 4 and its associated rod bank 5 are then raised by the rotation of the nut 45, the rising of the control rod 4 bringing about the abutment of the push button 52 with the teeth 62 of the ratchet 56 and then the driving of said button 52 into the control rod 4, the elastic washers 38 being compressed.

The movement of the control rod 4 is stopped when the insertion travel of the push button 52 is adequate to bring the groove 35 of the locking rod 34 level with the balls 33, which allows the separation of the control rod 4 from the pommel 18 of the rod bank 5, permitting said balls 33 to pass out of the locking groove 30 of the pommel 18 and to engage in the groove 35 of the rod 34.

The control rod 4 is then freed from the pommel 18 of the rod bank 5, which drops onto the upper end piece 19 of the fuel assembly 7 (FIG. 4b). During the descent of the pommel 18, the extracting tube 41, forced downwards by the spring 40, slides on the control rod 4 and takes the place previously occupied by the pommel 18 by rendering impossible, redundantly with the truncated cone-shaped contraction of the recess 32 of the balls 33, the loss of the balls 33 once they have been freed from the pommel 18. The movement of the extracting tube 41 is stopped by the clamp screw 43, the top of the axial opening 42 of said tube 41 abutting on the screw 43.

If for any reason the screw-nut mechanism A continues to raise the control rod 4 after the detachment of the rod bank 5, the push button 52 is progressively inserted in said rod 4 until the base 53 of the button 52 abuts against the shoulder 54 of the top jacket 4c of the rod 4, the balls 33 then projecting into the groove 35 of the locking rod 34, which then comes into the bottom position. The mechanism A is sufficiently powerful to then continue the rise of the control rod 4, by bringing about a retraction of the ratchets 56 by the separation of the magnetic poles 57 and 59.

By observing the electrical signature of the mechanism A, force on the ratchets 56 can be avoided, the electric currents being dependent on the torque and therefore the lifting force. In addition, sufficiently accurate control rod position detection systems are known to prevent such an exceeding of the travel, which is not in any case prejudicial to the equipment.

The freeing of the control rod 4 from the pommel 18 having taken place, said rod 4 is placed on the pommel 18 with the aid of its displacement mechanism A and is then released by breaking the current of the stator 46 and the two parts of the nut 45 are then moved apart under the effect of the thrust of the springs 49 on the pivoting arms 48.

During its descent, the control rod 4 is guided in rotation by fingers 20 sliding in sleeves 14 of the continuous guidance means 13. The electric power supply of the control coil 61 for the ratchets 59 is interrupted. The lower, mobile pole 59 drops under the effect of the expansion of the spring 60 and brings the ratchets 56 into the withdrawal position by acting on the links 58. The positioned assumed by the components according to the invention and the pommel 18 of the rod bank 5 is shown in FIG. 4c. The extracting tube 41 abuts against the pommel 18 of the rod bank 5, which rests on the upper end piece 19 of the fuel assembly 7. The spring 40 raises the control rod 4 and maintains the cylindrical 24 and square 25 contractions of said rod 4 respectively out of the cylindrical 28 and square 29 recesses of the pommel 18.

The balls 33 are maintained projecting into the groove 24 of the locking rod 34 by the extracting tube 41 and preventing the raising of said rod 34 under the thrust of the washers 38.

The control rods 4 are uncoupled and freed from the pommel 18 of the associated rod bank 5, successively or optionally in small groups.

An estimate is made of the total extraction travel of the rod bank 5 out of the fuel assembly 7 in order to ensure that uncoupling does not exceed about 10 centimeters. It is demonstrated by calculation that, under these conditions, the resulting anti-reactivity loss would be low and could be easily compensated by adding a minimum neutron poison quantity to the primary water. Thus, in order to have the same anti-reactivity quantity as in the prior art, in the case of individual detachment of the rod banks, it would be sufficient to increase the neutron poison concentration in the primary water by less than one part per million.

Once the cover 2 of the vessel 1 has been removed, the control rods 4 are discharged at the same time as the upper cores, the shoulder 22 of the rods 4 bearing on the attachment teeth 23 of the continuous guidance means 13 of the rod bank guide 9 when the cores are raised.

It can be seen that the arrangement of the control rod 4 with respect to the pommel 18 of the rod bank 5 obtained as a result of the invention and shown in FIG. 4c makes impossible an untimely extraction of the rod banks 5 from the fuel assemblies 7 during the operation of withdrawing the upper cores.

Following the reloading of the core, the upper cores are put back into place at the same time as the control rods 4 and the latter are in a relative position, with respect to their respective pommels 18, identical to that before the removal of the cover 2 and then that of the upper cores, as shown in FIG. 4c. The upper end of the control rods 4 projects over the rod bank guides 9.

To bring about recoupling, the control rod 4 is lowered until the bearing surface 26 at the bottom of the cylindrical contraction 24 of rod 4 abuts against the bearing surface 31 of the pommel 18 of the rod bank 5 (cf. FIG. 3). Descent takes place under the weight of the tools, which renders improbable equipment damage by overload application.

The lowering of the control rod 4 compresses the spring 40 and leads to a raising of the extracting tube 41 on the contraction 24 and then, when at the end of the movement the balls 33 face the locking groove 30 of the pommel 18 of the rod bank 5, the locking rod 34 rises under the effect of the thrust of the washers 38 expelling the balls 33 towards the outside of the truncated cone-shaped recess 32 and making said balls 33 project into the locking chamber 30 of the pommel 18. When the locking rod 34 is in upper abutment, it faces the balls 33 with a solid part maintaining them in the locking chamber 30 of the pommel 18 and in this way coupling takes place. The control rod 4 is then released.

Finally, when all the control rods 4 have been recoupled, the cover 2 is put back into place and then the reactor restarting operations continue.

Thus, by the use of very simple and reliable equipment, the invention makes it possible to reduce the duration of the annual shutdown of a pressurized water nuclear reactor for reloading and maintenance purposes.

It should be noted that the reduction of the shutdown time is of interest both economically and as regards dosimetry. The economic gain for a country having a large number of pressurized water reactors, such as France, could be about fifty days production every year.

The invention is not limited to the embodiment described and covers variants thereof. Thus, it is possible to use any type of mechanism for the displacement of the control rod and for the actuation of the operating rod.

Other types of fixing for the lower ends of the control rods with respect to the gripping member of the absorbing means can be envisaged.

Finally, the invention applies not only to pressurized water nuclear reactors, but also to any type of reactor where control takes place by the translations of absorbing means in the core and where said control is ensured by mechanism positioned outside the vessel and is transmitted to the absorbing means via a transmission member traversing the vessel.

I claim:

1. Mechanism for the uncoupling of a control rod (4) from an absorbing element (5, 18) for a nuclear reactor, incorporating an uncoupling operating rod (37) sliding in the control rod and having an upper end (52) projecting beyond the control rod, and a locking system (30, 32, 33) cooperating with the operating rod, the control rod and the absorbing element, characterized in that the operating rod is forced upwards by a spring (38) compressed between the operating rod and the control rod, a retractable stop (56) being provided above said upper end to bear on said upper end when the control rod (4) is raised, and in that the operating rod and locking system are designed so as to bring about uncoupling by forcing the operating rod downwards into the control rod.

2. Uncoupling mechanism according to claim 1, characterized in that the locking system comprises balls (33) partly located in cavities (32) of the control rod (4) and arranged around the operating rod (37), which has a groove (35) above a larger cross-section part, and cavities (30) of the absorbing element open onto the cavities of the control rod when the latter and the absorbing element are coupled, the balls then being partly located in the cavities of the absorbing element, forced by the larger cross-section part of the operating rod, and the balls being partly located in the groove of the operating rod and removed from the cavities of the absorbing element when uncoupling takes place.

3. Uncoupling mechanism according to claim 2, characterized in that the control rod comprises a sleeve (41) sliding around it, covering its cavities (32) when the uncoupling takes place and forced above said cavities by the absorbing element when coupled to the control rod.

4. Uncoupling mechanism according to claim 1, characterized in that the retractable stop (56) is controlled by a magnetized mechanism (59) sliding upwards in a sleeve (3) surrounding the control rod in order to open out the retractable stop above the operating rod and towards the bottom in order to retract the stop.

5. Uncoupling mechanism according to claim 1, further comprising two cylindrical fingers (20) fixed by means of radial ribs (21) to a lower part of the control rod (4) and sliding in split sleeve (14) of a continuous guiding part (13) when the control rod (4) is displaced over a certain height in the vicinity of the bottom, terminal position.

* * * * *